United States Patent [19]

Varga

[11] Patent Number: 4,641,572
[45] Date of Patent: Feb. 10, 1987

[54] MACHINE WITH A CENTRIFUGAL DRUM

[75] Inventor: Franz Varga, Murten, Switzerland

[73] Assignee: Rotorcafe AG, Switzerland

[21] Appl. No.: 692,580

[22] Filed: Jan. 18, 1985

[30] Foreign Application Priority Data

Feb. 10, 1984 [CH] Switzerland ............................ 651/84

[51] Int. Cl.$^4$ .......................... A47J 31/22; A47J 31/42
[52] U.S. Cl. .................................... 99/286; 99/289 R; 99/302 C
[58] Field of Search ...................... 99/286, 287, 289 R, 99/302 C:302 R, 300; 494/56, 57, 58, 59; 426/433

[56] References Cited

U.S. PATENT DOCUMENTS

| 3,107,600 | 10/1963 | Buisson | 99/286 |
| 3,967,546 | 7/1976 | Cailliot | 99/302 C |
| 4,074,621 | 2/1978 | Cailliot | 99/286 |

FOREIGN PATENT DOCUMENTS

| C 936,767 | 12/1956 | Fed. Rep. of Germany . |
| 1429852 | 11/1968 | Fed. Rep. of Germany . |
| 2428188 | 1/1975 | Fed. Rep. of Germany . |
| 2616296 | 10/1976 | Fed. Rep. of Germany . |
| 2626330 | 12/1976 | Fed. Rep. of Germany . |
| 1303836 | 8/1962 | France . |
| 1584848 | 11/1969 | France . |
| 2132310 | 11/1972 | France . |
| 600847 | 12/1977 | Switzerland . |

Primary Examiner—Robert W. Jenkins
Attorney, Agent, or Firm—Saidman, Sterne, Kessler & Goldstein

[57] ABSTRACT

An apparatus is provided for centrifuging liquid from a wet material. The apparatus includes a centrifugal drum and a stripper member positioned adjacent the centrifugal drum. The front side of the centrifugal drum is open and is arranged to be closed by a cover. The stripper is firmly connected to a driving shaft when the centrifugal drum is driven by means of a sliding clutch. A brake is provided for slowing down the centrifugal drum. During the centrifuging procedure, the centrifugal drum and the stripper rotate with the same number of revolutions and the cover is closed. After the centrifuging procedure, the centrifugal drum is slowed down with respect to the stripper and the cover is opened so that the still running stripper removes and ejects the residues.

20 Claims, 2 Drawing Figures

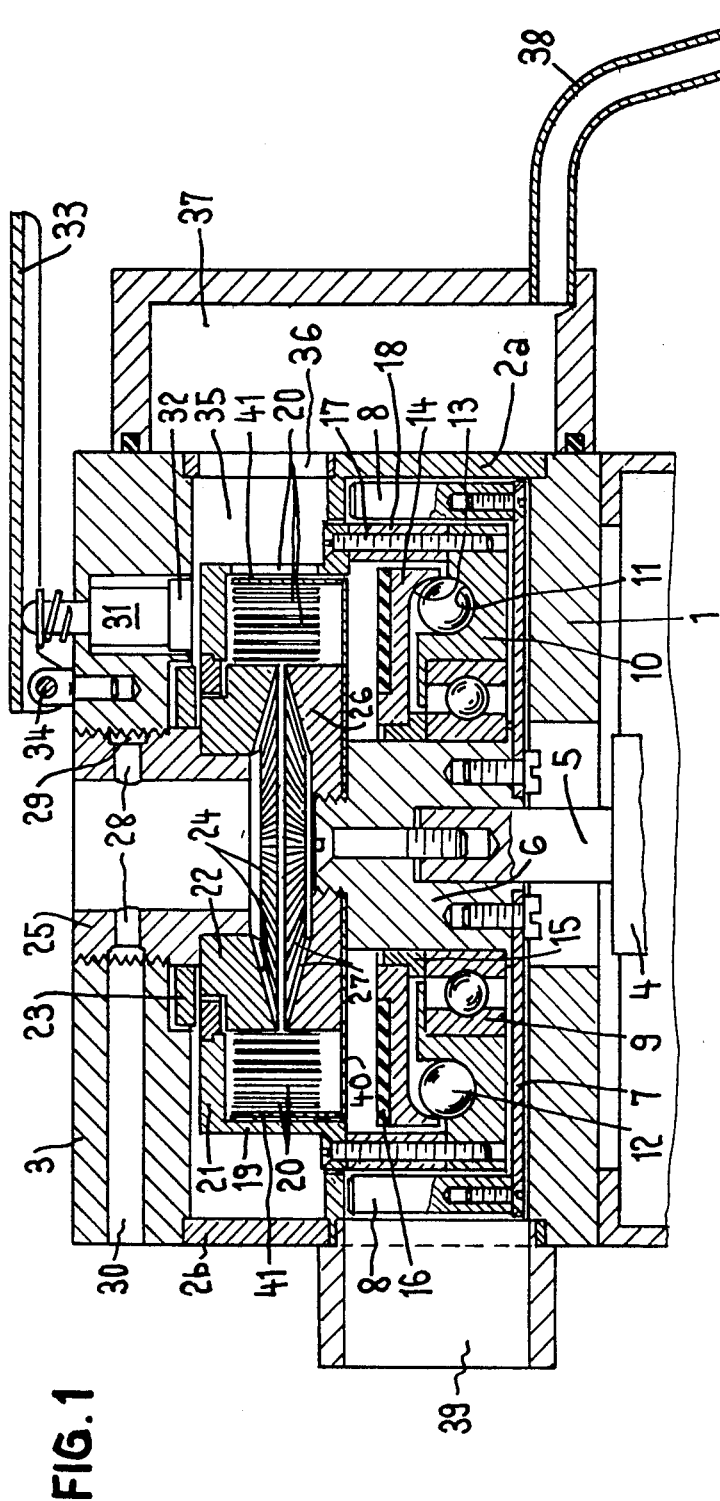
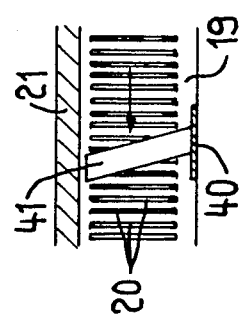
FIG. 1
FIG. 2

MACHINE WITH A CENTRIFUGAL DRUM

BACKGROUND OF THE INVENTION

The present invention relates to a machine with a centrifugal drum for centrifuging the liquid from a wet material and with a stripper for removing the residue from the centrifugal drum. A machine of this kind for preparing coffee extract is described in DE-OS No. 26 26 330. It comprises an extremely complicated gear mechanism for driving the centrifugal drum at different speeds, whereby the axle of the centrifugal drum is provided on one side of the principal driving axle of the machine. The centrifugal drum with its vertical axle is in parts continuously closed and in parts continuously open at the bottom which creates unfavourable working conditions. The machine is principally conceived for continuous working. As a result rapid and complete short time ejection of the coffee grounds after each boiling of individual portions is not possible.

It is also known to construct the centrifugal drum by means of two shells which may be axially shifted together and relative to each other. In a first axial position of the centrifugal drum, one may centrifuge the liquid from the wet material, more particularly by boiling of coffee. In a second axial position of the centrifugal drum, the same is opened by the relative axial displacement of both shells of the drum for radially centrifuging of the coffee grounds. A clean, complete removing of the coffee grounds in this case is practically not possible (DE-OS No. 26 16 296).

It is further known to mount in the centrifugal drum an axially slideable bottom which may be shifted axially for axially ejecting the residue, e.g. coffee grounds in a coffee machine (CH-PS No. 600 847). In this case, it is also difficult to achieve always a nice and rapid cleaning and to provide desirable working reliability.

SUMMARY OF THE INVENTION

A general object of the invention is to considerably simplify and improve the construction and the mode of working of a machine having a stripper of the kind described above. This object is achieved by providing a centrifugal drum that is closed at one front side by a lift off cover. The stripper and the centrifugal drum are driven at the same number of revolutions for centrifuging the liquid. The number of revolutions of the centrifugal drum may be reduced with respect to the number of revolutions of the stripper so that the axially extracting action of the rotating stripper ejects unavoidably the residue when the cover is lifted off. This construction permits an extremely rapid and complete cleaning due to the fact that when the centrifugal drum is slowed down with the stripper rotating at its full number of revolutions, the residue is suddenly and nearly completely removed through the end of the centrifugal drum which is exposed by the lifted cover. However, during the centrifugal procedure, the striper is ineffective because its number of revolutions coincide with the number of the centrifugal drum and the centrifugal drum is closed on both sides, so that any loss of liquid is avoided. The centrifugal drum may be optimally designed for processing a material, e.g. coffee to be extracted. It can be executed with a short axial length with respect to its diameter thereby providing a relatively small filtering surface, and because it is closed during the centrifugation, a material to be extracted like coffee powder and the extracting liquid may be brought together with any optimal distribution on the whole surface of the filter.

The centrifugal drum may be driven in a simple manner by means of, for example, a sliding clutch, a friction clutch, magnetic clutch or the like and the braking down of the centrifugal drum may occur by a simple mechanical brake. In this way, expensive, complicated and space consuming gear mechanisms are completely avoided because the machine according to the invention comprises substantially only parts which are secured to a single driving shaft and parts which are driven by this shaft through a sliding clutch. The actuation of the cover of the centrifugal drum is achieved by a simple mechanism dependent on the number of revolutions, whereby the closing of the cover may be achieved by centrifugal force and the opening of the cover by a spring force or by gravity.

The invention will be described further by way of an example of a coffee machine illustrated in the accompanying drawings.

BRIEF DESCRIPTION OF THE DRAWINGS

The foregoing and other objects, aspects, uses and advantages of the present invention will be more fully appreciated as the same become better understood from the following detailed description of the present invention when considered in connection with the accompanying drawings, in which:

FIG. 1 shows an axial section through the machine; and

FIG. 2 shows a partial section through the centrifugal drum.

DETAILED DESCRIPTION OF THE PREFERRED EMBODIMENT

The housing of the machine illustrated in FIGS. 1 and 2 comprises a bottom 1, a jacket in two parts 2a, 2b and a cover 3, these parts being firmly and tightly connected with each other. A driving motor, preferably an asynchrounous induction motor from which only the upper bearing 4 and the upwards projecting shaft 5 are shown, is provided under the bottom 1 of the housing. A hub 6 is screwed on the shaft 5. A fan disc 7 is screwed on the lower front side of the hub 6. The fan disc 7 bears fan blades 8, e.g. in form of two pins diametrically arranged and facing each other. The fan is thus still rigidly driven by the motor. On a shoulder of the hub 6 is placed the internal ring of a ball bearing on the external ring 9 of which a plate 10 is mounted. Thus, the plate 10 may rotate freely on the hub 6. Balls 12 are placed loosely in a circular groove 11 of the plate 10. Under the action of centrifugal force, the balls 12 may act against a downward curved annular surface 13 of a cover 14, the hub 15 of which is rotatably mounted on the hub 6 and supported by the inner ring of the corresponding ball bearing. The cover 14 comprises at its upper side a flat joint ring 16. The cover may thus rotate and be shifted axially on the hub 6. Under the action of the centrifugal force of the balls 12, the cover can be lifted from the illustrated initial position.

The plate 10 is connected by means of screws 17 and spacers 18 with a centrifugal drum 19, the jacket of which is provided with slits 20 thus acting as a filter. The upper flange 21 of the centrifugal drum 19 is engaged tightly into a groove between an upper rim 22 of a coffee mill and a ring 23 supported by the coffee mill. The centrifugal drum may thus freely rotate with the plate 10. The upper rim 22 of the coffee mill with its conical milling indentation 24 is supported by a threaded tube 25. The lower rim 26 of the coffee mill which comprises a corresponding conical indentation threadably engages the hub 6 and is consequently rigidly driven by the motor. By twisting of the threaded tube 25, the axial position of the non rotatable upper rim 22 of the coffee mill can be precisely adjusted, thus determining the fineness of the milled coffee. In the hole of the threaded tube 25 are radial bores 28 which communicate with an external circular space 29 in which opens a feeding pipe for hot boiling water. This water may be delivered by a not illustrated boiler of the machine itself or by another source of hot water.

In a bore of the cover 3 of the housing is provided a brake bolt 31 with a brake lining 32. The brake bolt 31 lies under a brake lever 33 which, under the action of pressure exerted at its end, may be urged downwards about an axle 34 in order to press the brake lining 32 against the upper flange of the centrifugal drum. A spring holds normally the lever 33 and the brake bolt 31 in the illustrated ineffective upper position.

Between the centrifugal drum 19 and the jacket 2b of the housing is provided a circular space 35 in which the coffee ejected towards the outside by the centrifugal drum is collected and flows from there through the dock 38 in a cup or a similar recipient. The fan blades 8 rotate in a circular space communicating with an ejecting dock 39 for the coffee grounds.

Between the hub 6 and the lower rim 26 of the coffee mill is clamped a thin arm 40, the ends of which are bent off to form two diametrically opposed thin cutters. These cutters 41 are inclined towards the front as shown by the arrow indicating the direction of rotation in FIG. 2. The arm 40 with the cutters forms a stripper for removing the coffee grounds as described later.

Coffee is prepared as follows: At first the motor is switched on. The parts connected to it, like the fan 7, 8, the stripper 40, 41 and the lower rim 26 of the coffee mill are immediately driven at the full number of revolutions. To the contrary, the plate 10, the centrifugal drum connected to it and the cover 14 are progressively set into rotation by the effective friction, whereby the number of revolutions of the parts 10 and 19 rigidly connected to each other and the one of the cover 14 must not exactly coincide. When the plate 10 reaches a determined number of revolutions, the cover 14 is lifted under the action of the balls 12 and its packing 16 is put against the lower circular opening of the centrifugal drum, between the external lower flange of the latter and the lower rim 26 of the coffee mill. The centrifugal drum is thus closed at the bottom. These movements occur in a relatively short time of e.g. one second. It is thus possible, nearly immediately after the motor has been switched on, to pour in a prepared quantity of coffee beans through the bore of the threaded tube 25. These beans are milled between the rims 22 and 26 of the coffee mill and the coffee powder is hurled against the filter-acting jacket of the centrifugal drum. Due to the fact that in the meantime the centrifugal drum is accelerated to the full speed, its number of revolutions coincide with the one of the stripper 40, 41 so that the stripper is ineffective and the building up of a layer of coffee powder is not disturbing. When the milling of the beans which have been added to the mill has been achieved, boiling water is let in through the pipe 30 and flows through the circular space 29 and the holes 28 downwards in the coffee mill and is thrown through the latter toward the exterior of the mill and against the jacket of the centrifugal drum. Residues of powder in the coffee mill are washed away so that the milled coffee in its entirety is intensively extracted. As already indicated, the coffee is extracted through the slitted filter acting jacket of the centrifugal drum and ejected in the collecting space 35. It flows in the manner already described and it can be collected at the dock 38. The milled coffee is rapidly extracted and it must then be removed from the machine. To this end, the brake is actuated by exerting a pressure on the lever 33. This produces a rapid braking of the centrifugal drum 19 and of the plate 10 rigidly connected to it as well as of the cover 14, which is still pressed against the centrifugal drum and, because the centrifugal force of the balls 12 decreases, the cover falls back in the illustrated position. The stripper 40, 41, however, rotates further at full speed whereby the cutters 41 which are inclined toward the front, strip off very rapidly and properly the coffee grounds from the internal side of the jacket of the centrifugal drum and eject them downwards through the centrifugal drum now open at the bottom. Due to the fan action of the coffee mill and more particularly of the fan, air is sucked in and the relatively dry coffee grounds are rapidly rejected through the dock 39 and are collected in a recipient not illustrated. The machine is thus cleaned. If the lever 33 is released, the plate 10 with the centrifugal drum and the cover 14 are again accelerated as previously described and coffee beans can again be poured in and processed. In this way, a plurality of coffee portions may be prepared, whereby for cleaning of the machine, it suffices to press the lever 33 when the motor is still running. It has been mentioned that the cover 14 is not necessarily accelerated as fast as the plate 10 and the centrifugal drum connected to it so that the cover may run against the edges of the opening of the centrifugal drum with a relative motion. This permits crushing and pulverizing possibly sticking coffee grains so that the latter cannot produce any leakage of the closed centrifugal drum. After each use of the coffee machine, either to prepare a single cup of coffee or more coffee protions, the machine can be washed. To this end, and with the motor still running, rinsing water is let in through the pipe 30 or, as the case may be, directly from above through the bore of the threaded tube 25. This water is accelerated by the coffee mill and hurled toward the outside to clean the centrifugal chamber and the collecting chamber and escape channels of the machine. It is advantageous to rinse the centrifugal drum at low speed by actuation of the braking lever or at rest in which case, due to the strong suction of the fan, the water hurled out through the coffee mill does not penetrate the filtering jacket of the centrifugal drum but is drawn downwards so that a certain return flow producing a backwards rinsing of the filter can take place.

If, after having prepared a cup of coffee, one forgets occasionally to press the lever 33 for removing the coffee grounds, the next charge of milled coffee is spread by running the motor on the already present coffee grounds and then also scalded. If the motor is switched out after the preparation of a single cup of coffee when the lever 33 is not actuated, the coffee grounds remain in the centrifugal drum. At the next switching on of the motor, the stripper rotates immediately at full speed and it removes the coffee grounds before the cover 14 closes the centrifugal drum 10 so that the machine is already cleaned for the preparation of a further portion of coffee.

It is indicated further that many balls 12 are uniformly distributed at the periphery in order to achieve a uniform pressure on the cover 14. In this connection, unillustrated pins may be provided or the plate 10 may be designed in the form of a cage in order to carry along the balls and to maintain them uniformly distributed at the periphery and to avoid unbalance. Weights acting on the cover 14 under the action of the centrifugal force may be used instead of the balls 12.

Various embodiments of the invention described above are possible. Even though it is advantageous to have a coffee mill built in the centrifugal drum, the machine may be conceived without such a coffee mill. In this case, milled coffee powder has to be filled up. However, this would require that an adequate centrifugal device be provided in order to distribute the coffee powder uniformly in the centrifugal chamber. The driving of the parts which are rigidly coupled with the motor is achieved in the simplest case by means of sliding clutches, as disclosed in the discussion of the preferred embodiment. If it would be necessary to define more precisely the accelerating moments, one could provide as the case may be special friction coatings, magnetic couplings or similar coupling means. The braking can also be electrically performed, e.g. by means of an electromagnet or by pneumatic or hydraulic means. This is particularly the case for large scale machines which are used for centrifuging a variety of wet materials. The opening and closing could also be performed by other means, whereby the control is rendered dependent on the number of revolutions of the plate 10 and the centrifugal drum 19. For very simple machines, the pipe 30 for scalding water is not required, in which case coffee beans are first introduced to the mill and then hot scalding water is manually introduced from above through the bore of the threaded tube 25. The coffee machine may be used in a variety of different forms and combinations, either for domestic arrangements or for industry or for automatic coffee installations. In the case of automatic coffee machines, the described procedures could be controlled automatically by a control program. The parts 2a and 2b of the housing jacket may be twisted against each other in order to adapt within certain limits the relative position of the dock 39 coupled with the lower part 2a and of the chamber 37 connected to the upper part 2b. It is also possible to mount the cover 14 with its actuating mechanism toward the top instead toward the bottom, whereby a spring, magnet or similar device could be provided to open the cover.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the attached claims.

I claim:

1. An apparatus for centrifuging liquid from a wet material, comprising:

a centrifugal drum having a removable cover mounted along a front side thereof;

stripper means adjacent said centrifugal drum for removing residue from the centrifuged material within said centrifugal drum;

drive means for rotatably driving said centrifugal drum and said stripper means at substantially the same number of revolutions per minute for centrifuging the liquid from the material; and braking means for reducing the rate of rotation of said centrifugal drum relative to that of said stripper means for providing axial extraction of said residue from the centrifugal drum when said cover is removed therefrom.

2. The apparatus according to claim 1, wherein said centrifugal drum is driven by clutch means coupled to said drive means, said stripper means being secured to said drive means.

3. The apparatus according to claim 1, further comprising actuating means responsive to the rotation rate of said centrifugal drum for directing movement of said cover between an open and a closed position.

4. The apparatus according to claim 3, wherein said stripper means comprises a plurality of inclined cutters.

5. The apparatus according to claim 4, wherein said stripper means comprises at least one arm extending radially outwardly from said drive means along one end of said centrifugal drum, said plurality of cutters extending axially from said arm, said centrifugal drum including an internal space for receiving material mill means.

6. The apparatus according to claim 3, further comprising a housing and first and second conduits adjustably mounted thereto, said first conduit being adapted to receive said centrifuged liquid and said second conduit being adapted to receive said material residue.

7. The apparatus according to claim 1, wherein said stripper means comprises a plurality of inclined cutters.

8. The apparatus according to claim 7, wherein said stripper means comprises at least one arm extending along one end of the centrifugal drum, said plurality of cutters extending axially from said arm, said centrifugal drum including an internal space for receiving material mill means.

9. The apparatus according to claim 8, wherein said material mill means includes a common inlet for receiving said material and liquid, said inlet providing means for continuous cleaning of the mill.

10. The apparatus according to claim 1, wherein said centrifugal drum has a diameter which is greater than its axial length.

11. The apparatus according to claim 1, further comprising a housing and first and second conduits adjustably mounted to said housing, said first conduit being adapted to receive said centrifuged liquid and said second conduit being adapted to receive said residue from the centrifuged material.

12. The apparatus according to claim 1, further comprising a housing having a liquid outlet and a residue outlet, said outlets being adjustably mounted to said housing.

13. The apparatus according to claim 1, wherein said cover is positioned under the centrifugal drum.

14. The apparatus according to claim 1, wherein said cover is closed upon generation of sufficient centrifugal force within the apparatus and is opened in response to gravitational force.

15. An apparatus for centrifuging liquid from a wet material, comprising:

a centrifugal drum having a removable cover mounted along a front side thereof;

striper means adjacent said centrifugal drum for removing residue from the centrifuged material within the centrifugal drum;

drive means for rotatably driving said centrifugal drum and said stripper means at substantially the same number of revolutions per minute for centrifuging the liquid from the material;

means for drying said residue; and braking means for reducing the rate of rotation of said centrifugal drum relative to that of said stripper means for providing axial extraction of said residue from the centrifugal drum when said cover is removed therefrom.

16. The apparatus according to claim 15, wherein said centrifugal drum is driven by clutch means coupled to said drive means, said stripper means being secured to said drive means.

17. The apparatus according to claim 15, further comprising actuating means responsive to the rotation rate of said centrifugal drum for directing movement of said cover between an open and a closed position.

18. The apparatus according to claim 17, wherein said stripper means comprises a plurality of cutters and an arm adjacent an end of said centrifugal drum, said plurality of cutters extending axially from said arm.

19. The apparatus according to claim 15, further comprising a housing and first and second conduits adjustably mounted to said housing, said first conduit being adapted to receive said liquid and said second conduit being adapted to receive said material residue.

20. As apparatus for centrifuging liquid from a wet material, comprising:

a housing;

a centrifugal drum positioned within said housing, said drum being closed along a front side by a removable cover;

stripper means adjacent said centrifugal drum comprising an arm extending along one end of said centrifugal drum and a plurality of inclined cutters extending from said arm;

drive means for rotatably driving said centrifugal drum and said stripper means at substantially the same number of revolutions per minute for centrifuging the liquid from the material;

braking means for reducing the rate of rotation of said centrifugal drum relative to that of said stripper means for providing axial extraction of material residue from the centrigual drum when said cover is removed therefrom;

actuating means responsive to said rotation rate of said centrifugal drum for directing movement of said cover between an open and a closed position; and first and second conduits adjustably mounted to said housing, said first conduit being adapted to receive said liquid centrifuged from said material and said second conduit being adapted to receive residue from the material centrifuged by the apparatus.

* * * * *